(12) United States Patent
Hirai et al.

(10) Patent No.: US 8,223,832 B2
(45) Date of Patent: Jul. 17, 2012

(54) RESOLUTION INCREASING APPARATUS

(75) Inventors: Ryusuke Hirai, Tokyo (JP); Noboru Yamaguchi, Saitama (JP); Yasunori Arai, Kanagawa (JP); Tsuyoshi Yamada, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 497 days.

(21) Appl. No.: 12/556,614

(22) Filed: Sep. 10, 2009

(65) Prior Publication Data
US 2010/0128170 A1 May 27, 2010

(30) Foreign Application Priority Data

Nov. 21, 2008 (JP) .................................. 2008-298248

(51) Int. Cl.
*H04B 1/66* (2006.01)
*H04N 7/12* (2006.01)
*H04N 11/02* (2006.01)
*H04N 11/04* (2006.01)

(52) U.S. Cl. .............. 375/240; 375/240.01; 375/240.12; 375/240.16

(58) Field of Classification Search .................. 375/240, 375/240.01, 240.2, 240.03, 240.04, 240.05, 375/240.12, 240.13, 240.16, 240.25, 240.26
See application file for complete search history.

(56) References Cited

U.S. PATENT DOCUMENTS

| | | | | |
|---|---|---|---|---|
| 5,612,743 A * | 3/1997 | Lee | ..................... | 375/240.16 |
| 5,978,030 A * | 11/1999 | Jung et al. | ................ | 375/240.16 |
| 6,269,121 B1 * | 7/2001 | Kwak | .................... | 375/240.16 |
| 6,934,336 B2 * | 8/2005 | Kurohmaru | .............. | 375/240.16 |
| 2003/0021484 A1 * | 1/2003 | Miki | ............................ | 382/236 |
| 2007/0269137 A1 | 11/2007 | Ida et al. | | |
| 2009/0074328 A1 | 3/2009 | Matsumoto et al. | | |

FOREIGN PATENT DOCUMENTS

JP 2007-310837 11/2007
JP 2009-070123 4/2009

OTHER PUBLICATIONS

ISO/IEC 14496-10/ITU-T Rec. H.264, International Communication Union, Series H, Audiovisual and Multimedia Systems, Published Dec. 15, 2000.
ISO/IEC 13818-2, Second Edition, Dec. 15, 2000.

* cited by examiner

*Primary Examiner* — Steven H Nguyen
*Assistant Examiner* — Adam Duda
(74) *Attorney, Agent, or Firm* — Turocy & Watson, LLP

(57) ABSTRACT

A resolution increasing apparatus including: a motion image decoding unit that sets a reference frame and a pixel of attention; a provisional-high-resolution-image generating unit that generates a provisional high-resolution image having the number of pixels larger than that of the reference frame; a determining unit that determines whether correction of a pixel value of a corresponding position of the provisional high-resolution image corresponding to the pixel of attention should be performed; and a high-resolution-image correcting unit that performs, when the determining unit determines that the correction is performed, predetermined correction processing and outputs, when the determining unit determines that the correction is not performed, the pixel value of the corresponding position of the provisional high-resolution image as a high-resolution image.

20 Claims, 14 Drawing Sheets

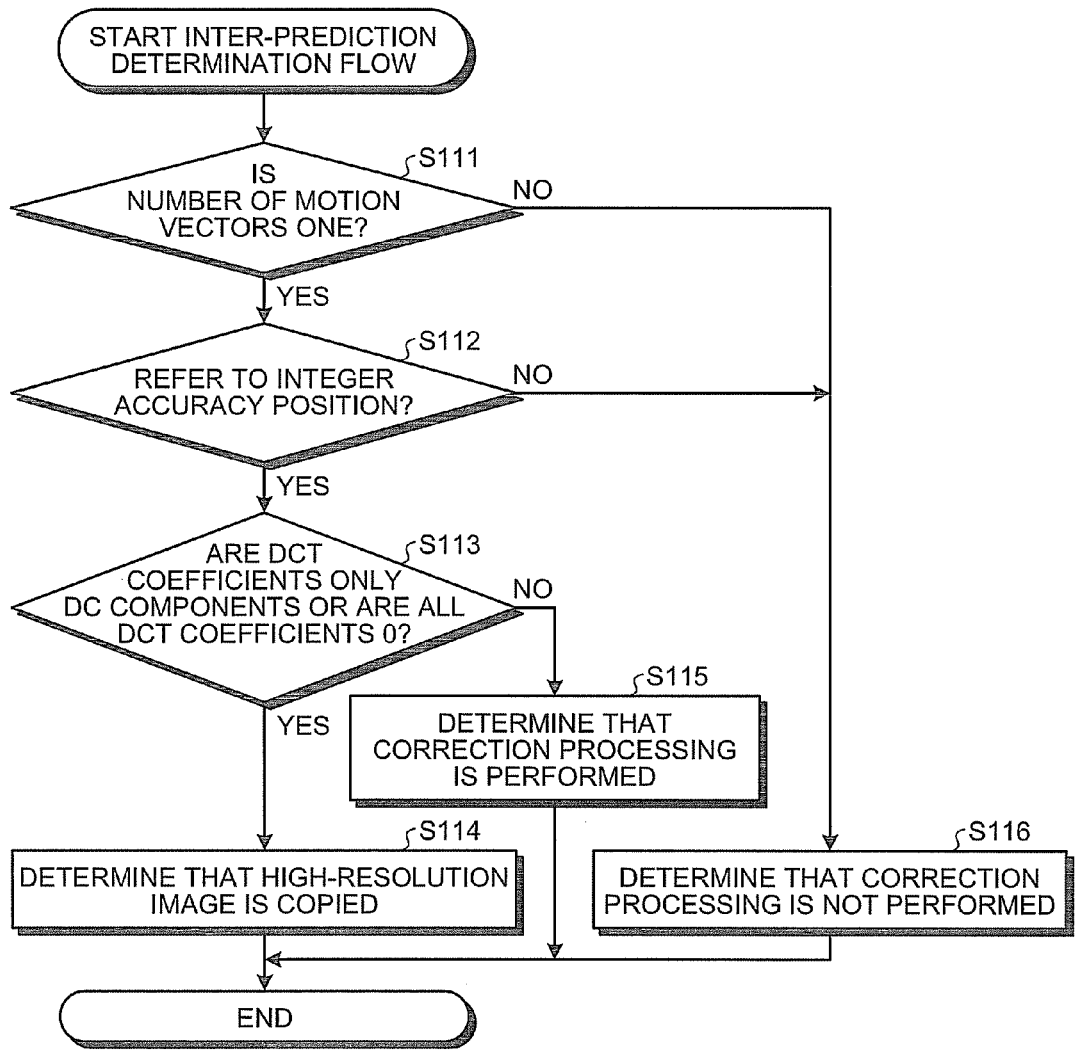

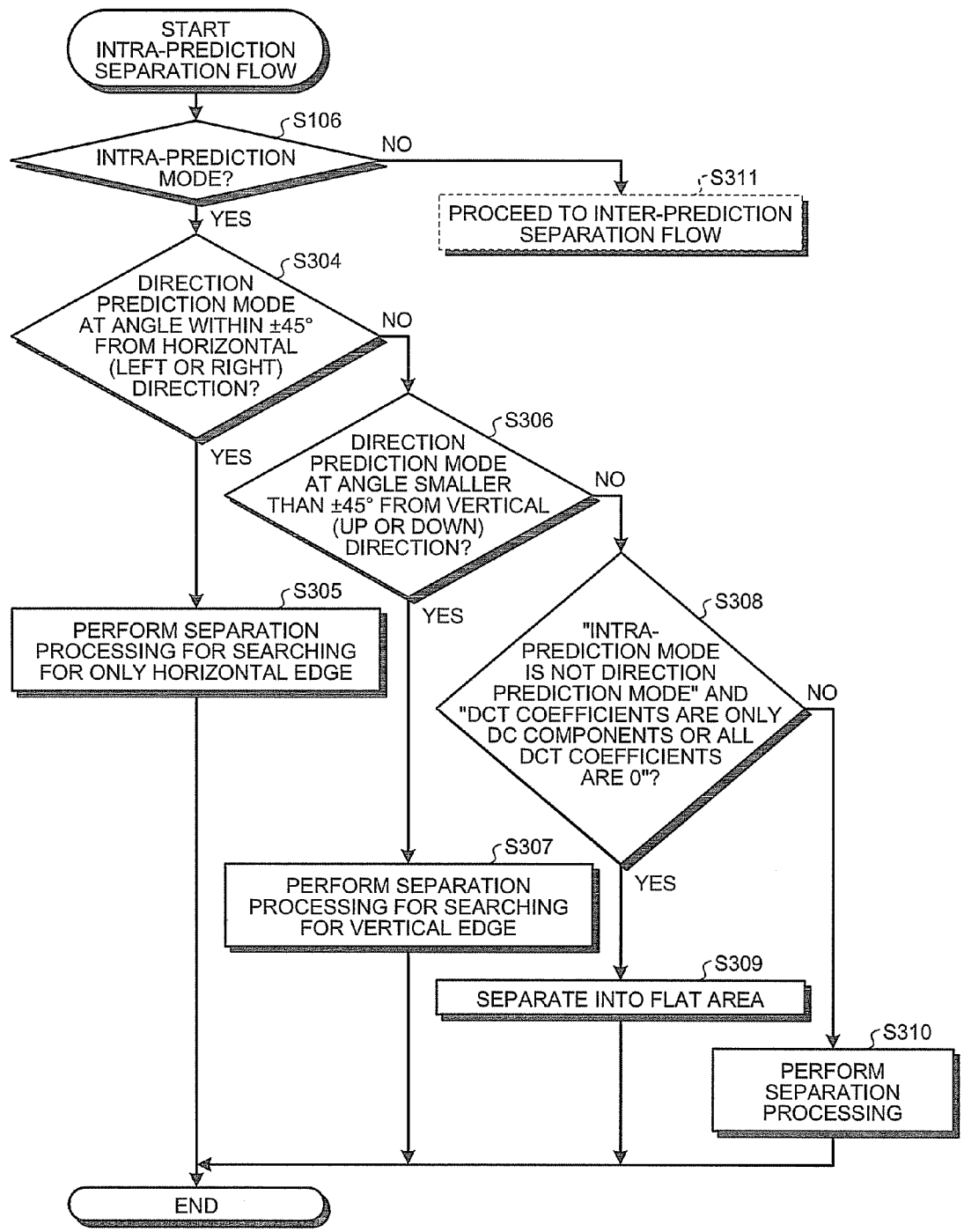

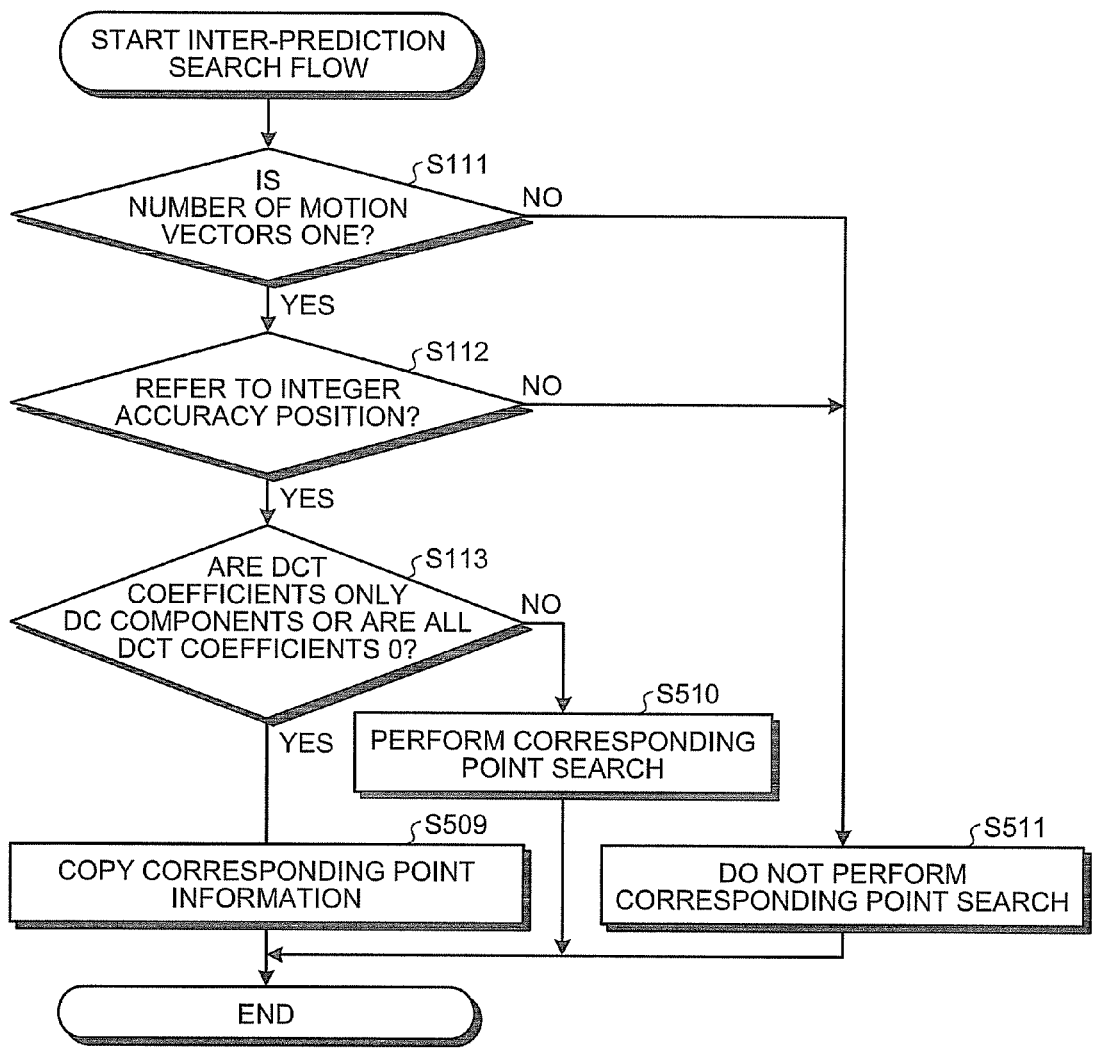

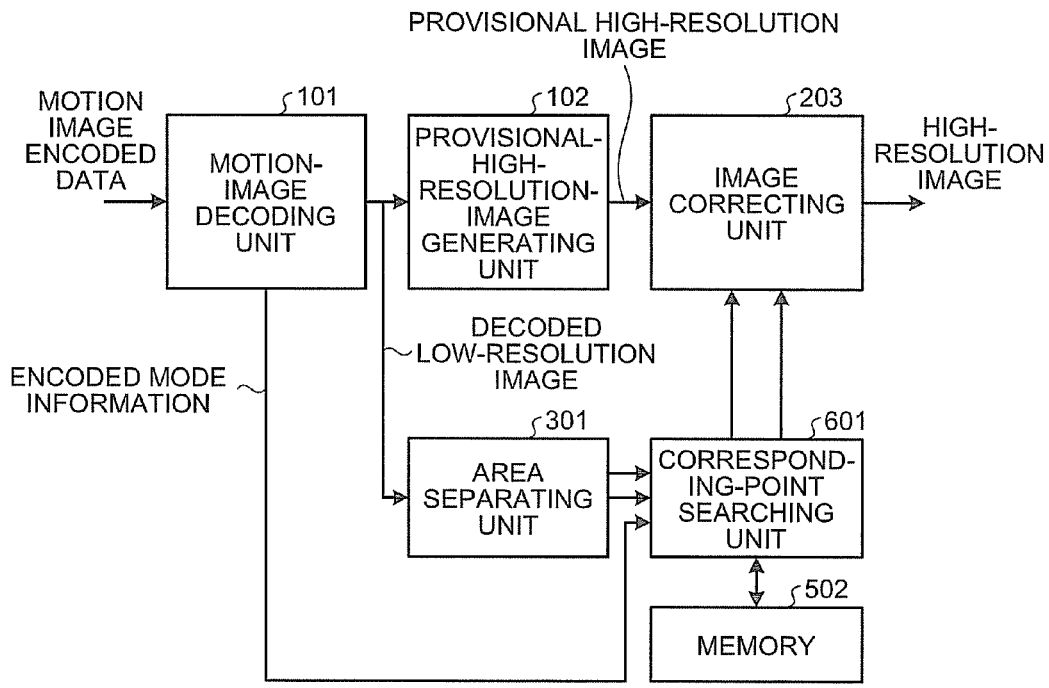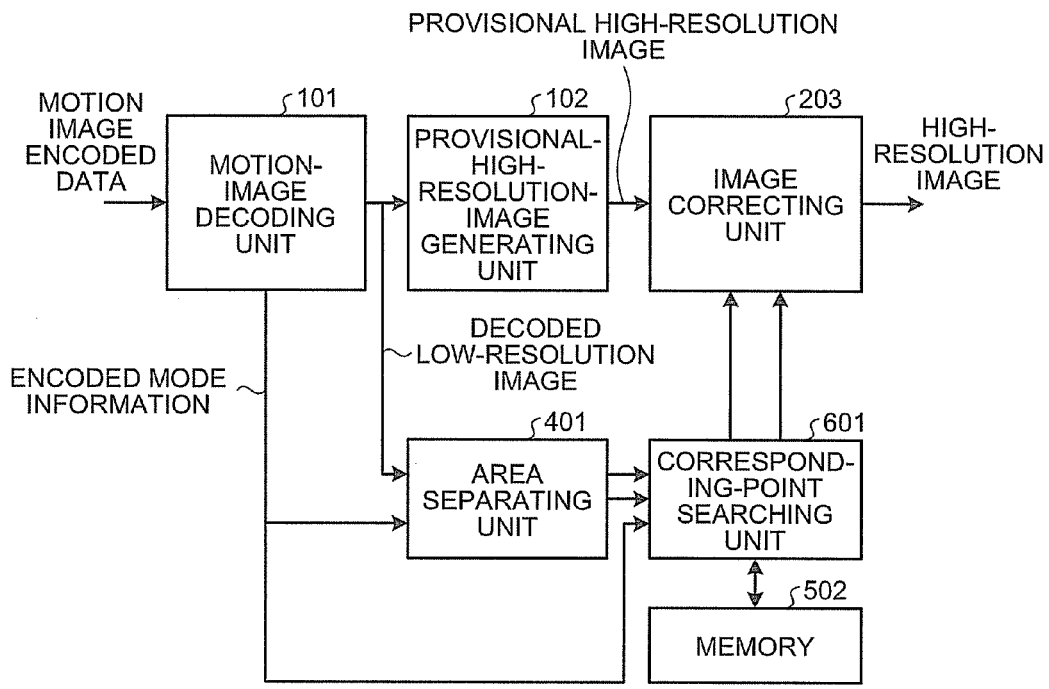

RESOLUTION INCREASING APPARATUS

CROSS-REFERENCE TO RELATED APPLICATIONS

This application is based upon and claims the benefit of priority from the prior Japanese Patent Application No. 2008-298248, filed on Nov. 21, 2008; the entire contents of which are incorporated herein by reference.

BACKGROUND OF THE INVENTION

1. Field of the Invention

The present invention relates to a resolution increasing apparatus.

2. Description of the Related Art

When resolution increasing processing is uniformly applied to a certain low-resolution image over an entire screen, even a noise component in a flat area of the image is sharpened. Therefore, a quality of a high-resolution image is deteriorated. Patent Document 1 discloses a technology for separating an image to be increased in resolution into a flat area and an edge area and applying different resolution increasing processing to each of the areas. As a method of separating an area, indexes of dispersion amount and the like of pixel values of pixels to be separated and peripheral pixels of the pixels are calculated and the area is separated according to values of the indexes. However, in the related art, a processing load is large because the separation processing is carried out and the resolution increasing processing is carried out for all low-resolution images for each of pixels.

BRIEF SUMMARY OF THE INVENTION

A resolution increasing apparatus according to an embodiment of the present invention comprises: a provisional-high-resolution-image generating unit that sequentially sets images formed by the image after the decoding as a reference frame, generates, from the reference frame, a provisional high-resolution image having a number of pixels larger than that of the reference frame according to interpolation processing, sets a plurality of pixels included in the reference frame as a pixel of attention one by one, and acquires, based on the encoded data, predetermined encoded mode information for each pixel of attention or each specific range including the pixel of attention; a determining unit that determines, based on encoded mode information corresponding to the pixel of attention, whether correction to a pixel value of a corresponding position of the provisional high-resolution image equivalent to a position of motion 0 with respect to the pixel of attention is performed; a corresponding-point searching unit that acquires a corresponding point corresponding to the pixel of attention at decimal number accuracy out of the image after the decoding; and an image correcting unit that applies, when the determining unit determines that the correction for the pixel value of the corresponding position of the provisional high-resolution image is performed, predetermined correction processing to the pixel value of the corresponding position of the provisional high-resolution image and outputs, when the determining unit determines that the correction is not performed, the pixel value of the corresponding position of the provisional high-resolution image as a high-resolution image.

A resolution increasing apparatus according to an embodiment of the present invention comprises: a provisional-high-resolution-image generating unit that sequentially sets images formed by the image after the decoding as a reference frame, generates, from the reference frame, a provisional high-resolution image having a number of pixels larger than that of the reference frame according to interpolation processing, sets a plurality of pixels included in the reference frame as a pixel of attention one by one, and acquires, based on the encoded data, predetermined encoded mode information for each pixel of attention or each specific range including the pixel of attention; an area separating unit that separates, based on encoded mode information corresponding to the pixel of attention, the pixel of attention into one area among a plurality of areas classified with reference to a difference between a pixel value of the pixel of attention and a pixel value of a pixel adjacent to the pixel of attention; a corresponding-point searching unit that does not perform search for a corresponding point concerning a pixel of attention separated into an area indicating that a difference between a pixel value of the pixel of attention and a pixel value of a pixel adjacent to the pixel of attention is smaller than a predetermined threshold and acquires a corresponding point corresponding to a pixel of attention separated into another area at decimal number accuracy out of the pixel signal after the decoding; and an image correcting unit that performs predetermined correction processing concerning a pixel value of a corresponding position of the provisional high-resolution image corresponding to a pixel of attention to which the corresponding-point searching unit applies the corresponding point search and, concerning a pixel value of a corresponding position of the provisional high-resolution image corresponding to a pixel of attention to which the corresponding-point searching unit does not apply the corresponding point search, does not perform the correction processing and outputs the pixel value of the corresponding position of the provisional high-resolution image as a high-resolution image.

A resolution increasing apparatus according to an embodiment of the present invention comprises: a provisional-high-resolution-image generating unit that sequentially sets images formed by the image after the decoding as a reference frame, generates, from the reference frame, a provisional high-resolution image having a number of pixels larger than that of the reference frame according to interpolation processing, sets a plurality of pixels included in the reference frame as a pixel of attention one by one, and acquires, based on the encoded data, predetermined encoded mode information for each pixel of attention or each specific range including the pixel of attention; a corresponding-point searching unit that does not perform search for a corresponding point when a difference between a pixel value of the pixel of attention and a pixel value of a pixel adjacent to the pixel of attention is smaller than a predetermined corresponding point search threshold and acquires, based on encoded mode information corresponding to the pixel of attention, a corresponding point of the pixel of attention out of the image after the decoding at decimal number accuracy when the difference is larger than the predetermined corresponding point search threshold; and an image correcting unit that performs predetermined correction processing concerning a pixel value of a corresponding position of the provisional high-resolution image corresponding to a pixel of attention to which the corresponding-point searching unit applies the corresponding point search and, concerning a pixel value of a corresponding position of the provisional high-resolution image corresponding to a pixel of attention to which the corresponding-point searching unit does not apply the corresponding point search, does not perform the correction processing and outputs the pixel value of the corresponding position of the provisional high-resolution image as a high-resolution image.

BRIEF DESCRIPTION OF THE DRAWINGS

FIG. 3C is a flowchart of processing by the determining unit;

FIG. 7B is a flowchart of processing by the area separating unit;

FIG. 10C is a flowchart of processing by the corresponding-point searching unit;

FIG. 12 is a block diagram of a configuration example of a resolution increasing apparatus according to a fifth embodiment of the present invention; and FIG. 13 is a block diagram of a configuration example of a resolution increasing apparatus according to the fifth embodiment.

DETAILED DESCRIPTION OF THE INVENTION

Exemplary embodiments of resolution increasing apparatus according to the present invention will be explained below in detail with reference to the accompanying drawings. The present invention is not limited to the following embodiments.

Figure 1:
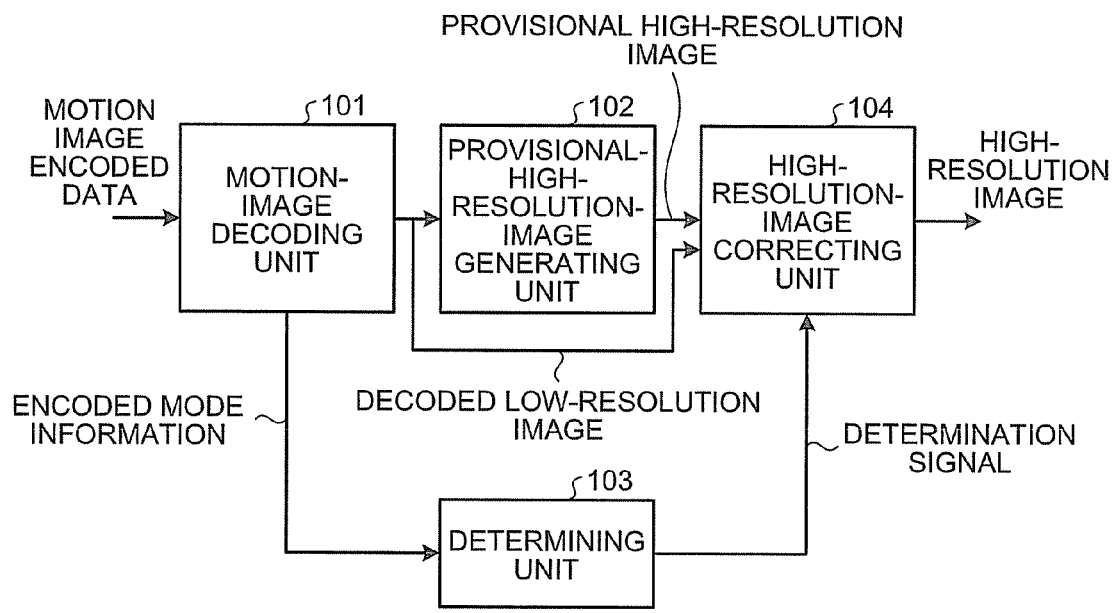
FIG. 1 is a block diagram of a configuration example of a resolution increasing apparatus according to a first embodiment of the present invention.

FIG. 1 is a block diagram of a configuration example of a resolution increasing apparatus according to a first embodiment of the present invention. The resolution increasing apparatus includes a motion image decoding unit 101, a provisional-high-resolution-image generating unit 102, a determining unit 103, and a high-resolution-image correcting unit 104.

The motion image decoding unit 101 receives the input of motion image encoded data, performs decoding processing, and outputs a decoded low-resolution image and encoded mode information. The motion image decoding unit 101 sequentially sets images subjected to resolution increasing processing as a reference frame out of the decoded low-resolution image. The motion image sequentially sets pixels included in the reference frame as a pixel of attention one by one and sets a macro block including the pixel of attention. The encoded mode information includes prediction mode information, a motion vector, an orthogonal transform coefficient, and a quantization parameter. As an example, the motion image decoding unit 101 outputs the encoded mode information for each of macro blocks. The motion image decoding unit 101 can output the encoded mode information for each of sub-macro blocks. The motion image decoding unit 101 can output the encoded mode information for each of pixels.

The provisional-high-resolution-image generating unit 102 receives the input of a decoded low-resolution image set as the reference frame, creates a provisional high-resolution image having predetermined resolution according to, for example, a cubic convolution using a general interpolation file, and outputs the provisional high-resolution image to the high-resolution-image correcting unit 104. The provisional high-resolution image is an image having the number of pixels equivalent to that of a target high-resolution image. Usually, the provisional high-resolution image is in a state in which a subject in a screen is blurred or a state in which a section that should originally be linear is represented stepwise.

The determining unit 103 determines, based on the encoded mode information from the motion image decoding unit 101, for each of macro blocks including the pixel of attention, whether correction of a pixel value in a corresponding position of the provisional high-resolution image corresponding to pixels included in the macro block should be performed and outputs a determination signal to the high-resolution-image correcting unit 104. A certain pixel is set as a pixel of attention and a decoded low-resolution image of a reference frame including the pixel of attention is provisionally increased in resolution to obtain a provisional high-resolution image. The corresponding position indicates pixels in the provisional high-resolution image in a position of motion 0 with respect to the pixel of attention. Details of determination processing are explained later.

Figure 2:
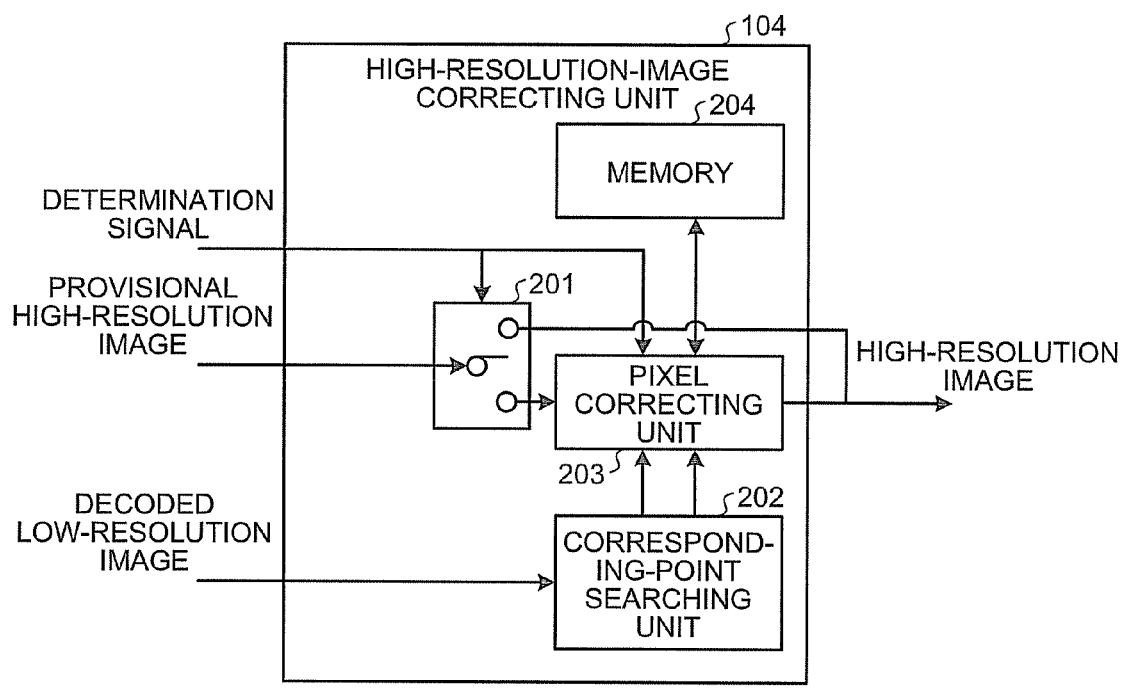
FIG. 2 is a block diagram of a configuration example of a high-resolution-image correcting unit according to the first embodiment.

The high-resolution-image correcting unit 104 corrects, based on the determination signal from the determining unit 103, a pixel value of the provisional high-resolution image in the corresponding position of the pixel of attention. FIG. 2 is a block diagram of a configuration example of the high-resolution-image correcting unit 104. The high-resolution-image correcting unit 104 includes a switch 201, a corresponding-point searching unit 202, a pixel correcting unit 203, and a memory 204.

The switch 201 switches, based on the determination signal from the determining unit 103, an output destination of the provisional high-resolution image. The corresponding-point searching unit 202 searches for a corresponding point and outputs corresponding point search information as a result of the search and a decoded low-resolution image to the pixel correcting unit 203. When pixel values of pixels in a range of several pixels in the four directions around the pixel of attention and pixel values of pixels included in the same size as the range approximate to each other most, the corresponding point is a pixel in the center of the range in the decoded low-resolution image. The corresponding point can be set in a frame other than the reference frame or can be set in the reference frame. The search is performed at decimal number accuracy according to an existing method such as a parabola fitting method or an over-sampling method. The pixel correcting unit 203 performs, based on the determination signal from the determining unit 103, correction of the pixel value in the corresponding position of the provisional high-resolution image according to a projection onto convex sets (POCS) method or a superimposition method. Alternatively, the pixel correcting unit 203 replaces the pixel value with a pixel value same as that of a high-resolution image generated in the past. The memory 204 stores the high-resolution image generated in the past. A method of searching for the corresponding point and a method of correcting the pixel value are not limited to the methods explained above and can be other methods.

The resolution increasing apparatus according to this embodiment performs conversion processing for an image in two units: the provisional-high-resolution-image generating unit 102 and the high-resolution-image correcting unit 104. In other words, the resolution increasing apparatus performs image conversion processing in two stages.

Figure 3A:
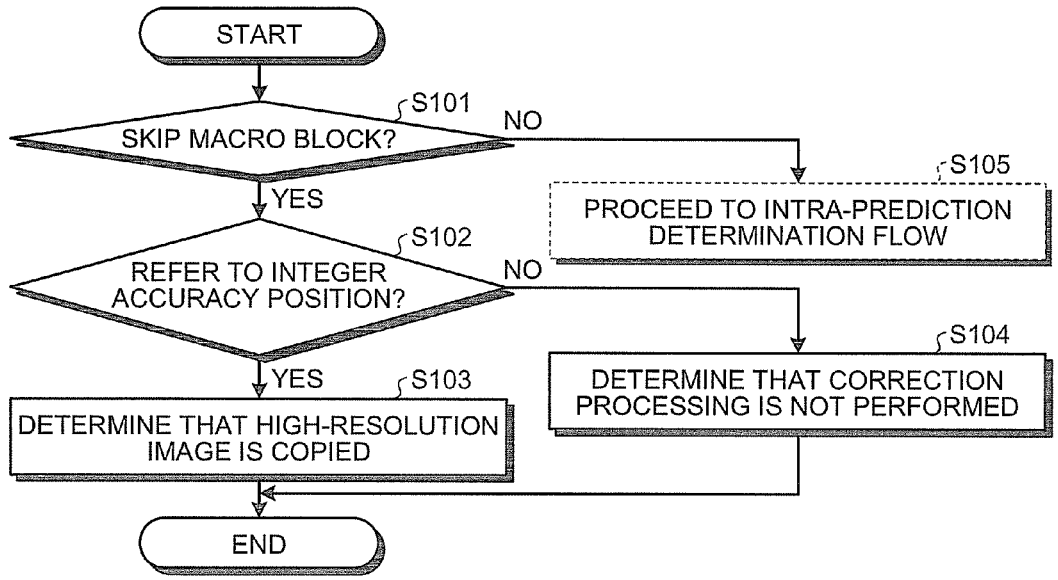
FIG. 3A is a flowchart of processing by a determining unit.

FIG. 3A is a flowchart of the processing by the determining unit 103. The determining unit 103 determines, based on the encoded mode information, that the macro block including the pixel of attention is a skip macro block ("Yes" at step S101). The determining unit 103 determines whether a motion vector of the macro block including the pixel of attention refers to an integer accuracy position (step S102).

When the motion vector refers to the integer accuracy position ("Yes" at step S102), the determining unit 103 determines that the pixel value of the provisional high-resolution image in the corresponding position of the pixels included in the macro block is set the same as a pixel position of a position equivalent to a corresponding position of a provisional high-resolution image in the high-resolution image generated in the past (hereinafter, "first reference position") (step S103). The determining unit 103 outputs a determination signal to the high-resolution-image correcting unit 104.

On the other hand, when the motion vector does not refer to the integer accuracy position in the processing at step S102 ("No" at step S102), the determining unit 103 assumes that a low-resolution image in the macro block including the pixel of attention does not have sharpness of an image quality enough for showing an effect of the resolution increasing processing. The determining unit 103 determines that correction processing is not applied to the pixel value of the provisional high-resolution image in the corresponding position of the pixels included in the macro block (step S104). The determining unit 103 outputs a determination signal to the high-resolution-image correcting unit 104.

Figure 3B:
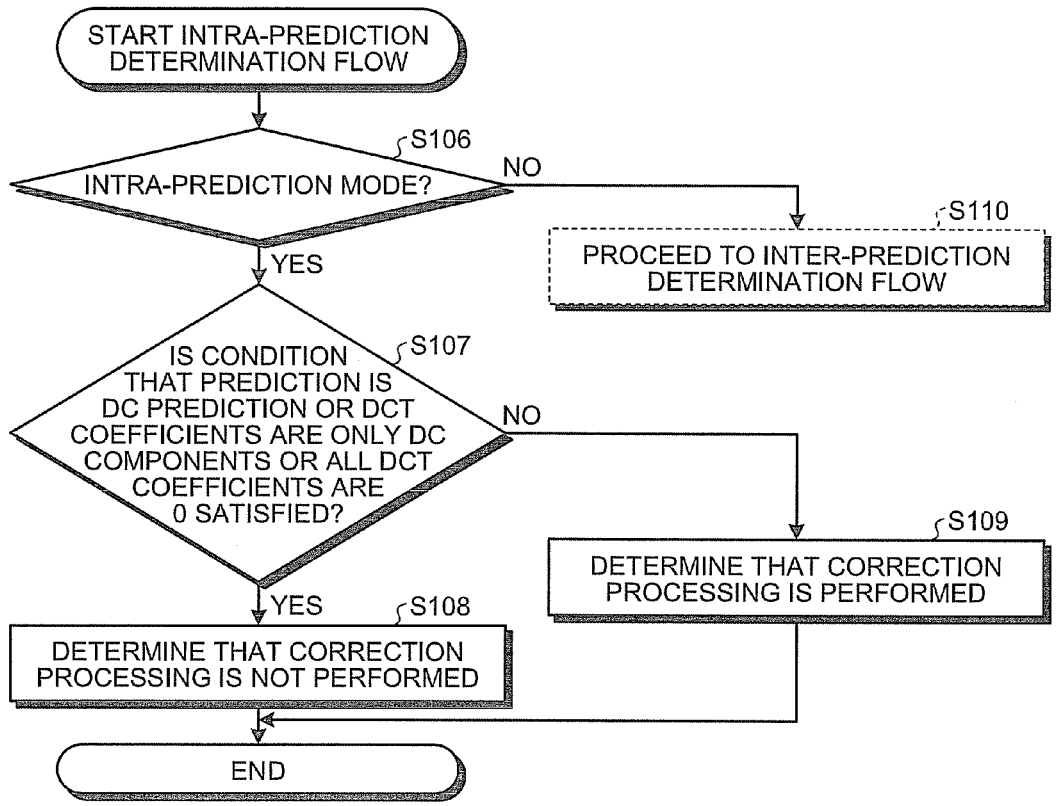
FIG. 3B is a flowchart of processing by the determining unit.

When the macro block including the pixel of attention is not the skip macro block ("No" at step S101), the determining unit 103 proceeds to an intra-prediction determination flow (step S105). FIG. 3B is a flowchart of the intra-prediction determination flow.

The intra-prediction determination flow by the determining unit 103, i.e., determination processing performed when a prediction mode of the macro block including the pixel of attention is an intra-prediction mode is explained with reference to FIG. 3B. The same determination processing is performed when a prediction mode of the sub-macro block is the intra-prediction mode.

When the prediction mode of the macro block including the pixel of attention is the intra-prediction mode ("Yes" at step S106) and a condition that "prediction is DC prediction, or DCT coefficients are only direct current components (DC components), or all the DCT coefficients are 0" is satisfied ("Yes" at step S107), the determining unit 103 determines that the correction processing is not applied to the pixel value of the provisional high-resolution image in the corresponding position of the pixels included in the macro block (step S108). The determining unit 103 outputs a determination signal to the high-resolution-image correcting unit 104.

On the other hand, when none of the conditions that prediction is DC prediction, DCT coefficients are only direct current components (DC components), and all the DCT coefficients are 0 is satisfied ("No" at step S107), the determining unit 103 determines that the correction processing is applied to the pixel value of the provisional high-resolution image in the corresponding position of the pixels included in the macro block (step S109). The determining unit 103 outputs a determination signal to the high-resolution-image correcting unit 104.

When the prediction mode of the macro block including the pixel of attention is not the intra-prediction mode ("No" at step S106), the determining unit 103 proceeds to an inter-prediction determination flow (step S110). FIG. 3C is a flowchart of the inter-prediction determination flow.

The inter-prediction determination flow by the determining unit 103, i.e., determination processing performed when a prediction mode of the macro block including the pixel of attention is an inter-prediction mode is explained with reference to FIG. 3C. The same determination processing is performed when a prediction mode of the sub-macro block is the inter-prediction mode.

When the number of motion vectors of the macro block including the pixel of attention is one ("Yes" at step S111), the determining unit 103 determines whether the motion vector refers to an integer accuracy position (step S112). When it is determined that the motion vector refers to the integer accuracy position ("Yes" at step S112) and DCT coefficients of the macro block are only DC components or all the DC coefficients are 0 ("Yes" at step S113), the determining unit 103 determines that a pixel value of the provisional high-resolution image in the corresponding position of the pixels included in the macro block is set the same as a pixel value of the first reference position of the high-resolution image generated in the past (step S114). The determining unit 103 outputs a determination signal to the high-resolution-image correcting unit 104.

When the condition that the DCT coefficients of the macro block are only DC components or all the DCT coefficients are 0 is not satisfied ("No" at step S113), the determining unit 103 determines that the correction processing is applied to the pixel value of the provisional high-resolution image in the corresponding position of the pixels included in the macro block (step S115). The determining unit 103 outputs a determination signal to the high-resolution-image correcting unit 104.

In the processing at step S111, when the number of motion vectors of the macro block including the pixel of attention is equal to or larger than two ("No" at step S111), the determining unit 103 assumes that a prediction image created based on the low-resolution image is blurred because an average of a plurality of pixels are used. The determining unit 103 determines that the correction processing is not applied to the pixel value of the provisional high-resolution image in the corresponding position of the pixels included in the macro block (step S116). The determining unit 103 outputs a determination signal to the high-resolution-image correcting unit 104.

In the processing at step S112, when the motion vector does not refer to the integer accuracy position ("No" at step S112), the determining unit 103 assumes that a low-resolution image in the macro block including the pixel of attention does not have sharpness of an image quality enough for showing an effect of the resolution increasing processing. The determining unit 103 determines that correction processing is not applied to the pixel value of the provisional high-resolution image in the corresponding position of the pixels included in the macro block (step S116). The determining unit 103 outputs a determination signal to the high-resolution-image correcting unit 104.

Even when the determining unit 103 determines in the processing that the correction processing is not performed (steps S104 and S116), if there is a margin in a calculation amount of the apparatus, the correction processing can be applied to the pixel value of the provisional high-resolution image in the corresponding position of the pixels included in the macro block.

When the determining unit 103 determines that the correction processing is performed (steps S109 and S115) or when the determining unit 103 determines that the correction processing is performed because there is a margin in the calculation amount (steps S104 and S116), the correction processing can be performed according to comparison with a threshold explained below.

Figure 4:
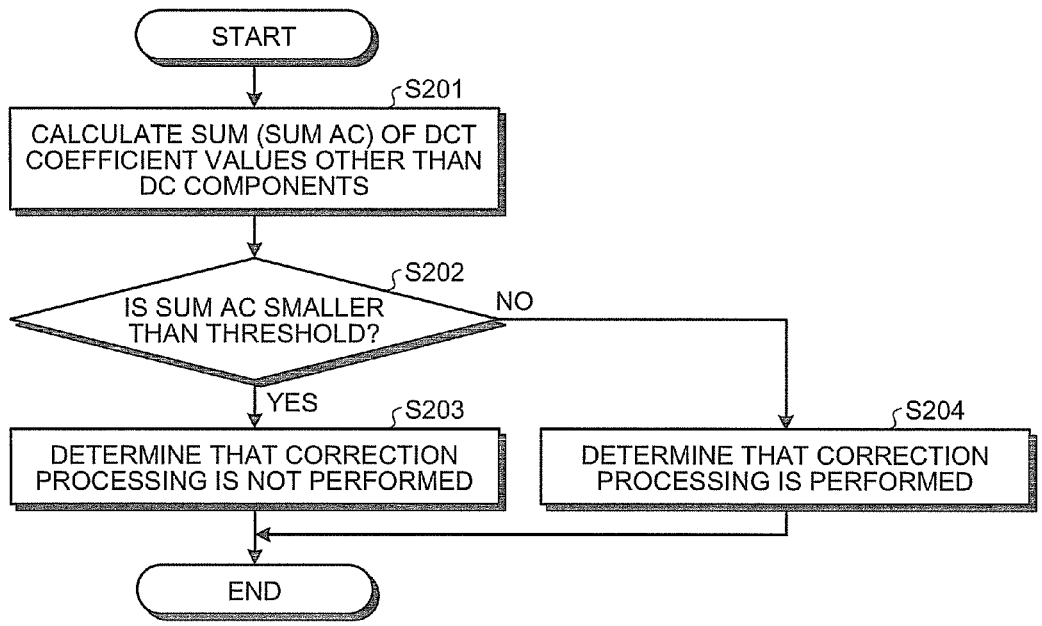
FIG. 4 is a flowchart of processing by the determining unit.

FIG. 4 is a flowchart of comparison processing with the threshold. The determining unit 103 calculates a sum SumAC of DCT coefficient values other than DC components (step S201) and compares the calculated sum SumAC and a threshold TH (step S202).

The threshold TH is set based on a quantization parameter qscale. For example, the threshold TH is represented by the following linear expression:

$$TH_x = \alpha_x \times qscale + offset_x \quad (1)$$

where, $x \in \{intra, inter\}$. $\alpha_{inter}$ and $\alpha_{intra}$ are proportional coefficients having a relation of "$\alpha_{inter} < \alpha_{intra}$". $offset_{inter}$ and $offset_{intra}$ are parameters that can be arbitrarily set by a user.

For example, when the sum SumAC is smaller than the threshold TH ("Yes" at step S202), the determining unit 103 determines that the correction processing is not applied to the pixel value of the provisional high-resolution image in the corresponding position of the pixels included in the macro block (step S203). The determining unit 103 outputs a determination signal to the high-resolution-image correcting unit 104. On the other hand, when the sum SumAC is equal to or larger than the threshold TH ("No" at step S202), the determining unit 103 determines that the correction processing is applied to the pixel value of the provisional high-resolution image in the corresponding position of the pixels included in the macro block (step S204). The determining unit 103 outputs a determination signal to the high-resolution-image correcting unit 104.

The high-resolution-image correcting unit 104 performs processing explained below based on the determination signal output by the determining unit 103.

When the determining unit 103 determines that the correction processing is not performed, in the high-resolution-image correcting unit 104, the switch 201 connects a switch to an upper side. The high-resolution-image correcting unit 104 outputs the pixel value of the corresponding position of the provisional high-resolution image as a high-resolution image.

When the determining unit 103 determines that the correction processing is performed, in the high-resolution-image correcting unit 104, the switch 201 connects the switch to a lower side. The pixel correcting unit 203 calculates, based on the corresponding point search information and the decoded low-resolution image from the corresponding-point searching unit 202, a correction amount of the pixel value of the corresponding position of the provisional high-resolution image and outputs the pixel value after the correction as a high-resolution image.

When the determining unit 103 determines that the pixel value of the provisional high-resolution image in the corresponding position of the pixels included in the macro block is set the same as a pixel value of the first reference position of the high-resolution image generated in the past, in the high-resolution-image correcting unit 104, the switch 201 connects the switch to the lower side. The pixel correcting unit 203 extracts the pixel value of the first reference position of the high-resolution image generated in the past from the memory 204. The pixel correcting unit 203 sets the pixel value of the corresponding position of the provisional high-resolution image the same as the pixel value of the first reference position and outputs the pixel value as a high-resolution image.

As explained above, according to this embodiment, the determining unit 103 determines, based on the encoded mode information, whether the image correction processing should be performed for each of macro blocks including the pixel of attention. This makes it possible to limit pixels to which the image correction processing is applied and reduce a processing load necessary for increasing resolution of an image.

In a second embodiment of the present invention, the high-resolution-image correcting unit 104 has an area separating unit. Differences from the first embodiment are explained below.

Figure 5:
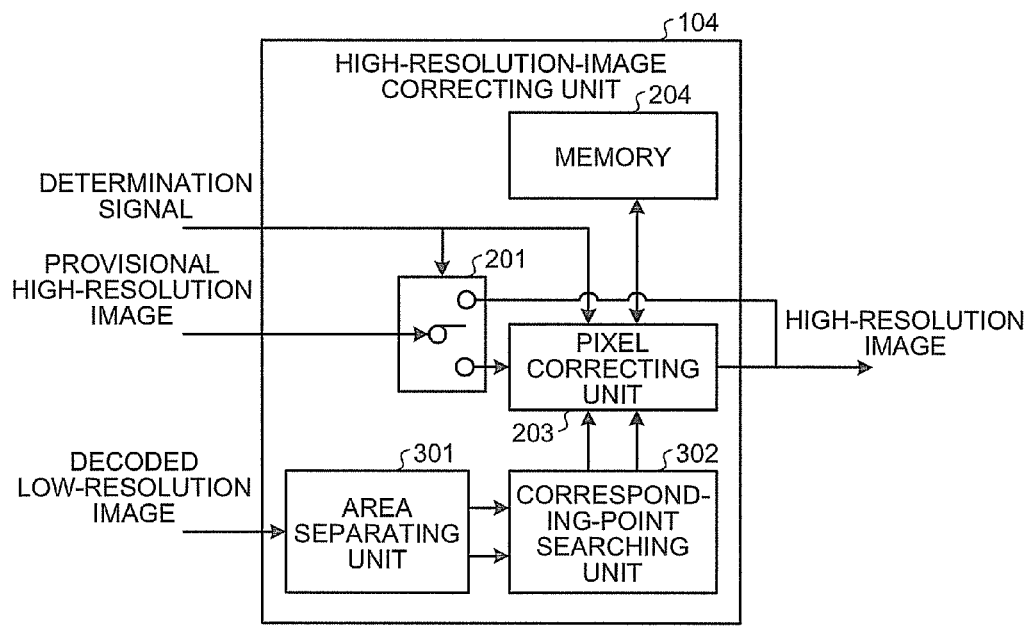
FIG. 5 is a block diagram of a configuration example of a high-resolution-image correcting unit according to a second embodiment of the present invention.

FIG. 5 is a block diagram of a configuration example of the high-resolution-image correcting unit 104 according to the second embodiment. The high-resolution-image correcting unit 104 includes an area separating unit 301 and a corresponding-point searching unit 302 in addition to the components shown in FIG. 2 in the first embodiment.

As in the first embodiment, the resolution increasing apparatus according to the second embodiment applies conversion processing to an image in two components: the provisional-high-resolution-image generating unit 102 and the high-resolution-image correcting unit 104. In other words, the resolution increasing apparatus performs image conversion processing in two stages.

The area separating unit 301 receives the input of a decoded low-resolution image and separates, for each pixel of attention, based on differences between a pixel value of the pixel of attention and pixel values of a plurality of pixels adjacent to the pixel of attention, an image into any one of two or more kinds of areas. As a method of separating an area, there is a method of separating the area into two areas: an edge area in which a change in a pixel value linearly occurs and a flat area other than the edge area. The edge area and the flat area can be separated by using an existing Sobel filter.

It is also possible to separate the area into three areas: an edge area, a texture area including a large number of pixels in which a change in a pixel value is large in a local area, and a flat area in which a change in a pixel value is small in a local area. For example, in an area separated into the flat area, differences between a pixel value of the pixel of attention and pixel values of a plurality of pixels adjacent to the pixel of attention are calculated. For example, when a sum of absolute values of the differences is equal to or larger than a specific threshold, the area is set as the texture area. When the sum is smaller than the threshold, the area is set as the flat area. In the following explanation, the area is separated into the two areas: the edge area and the flat area.

The corresponding-point searching unit 302 searches for a corresponding point based on the area separation information and the decoded low-resolution image from the area separating unit 301. A searching method for a corresponding point is the same as that in the first embodiment. However, the search for a corresponding point is not applied to pixels determined by the area separating unit 301 as the flat area. The corresponding-point searching unit 302 outputs corresponding point search information as a result of the search and the decoded low-resolution image to the pixel correcting unit 203.

In this embodiment, the area separation is performed before the corresponding point search. A pixel value of a provisional high-resolution image of a corresponding position of the pixels separated into the flat area is directly output as a high-resolution image (because a pixel value of the pixels of the provisional high-resolution image is sufficient). Therefore, concerning the pixels separated into the flat area by the area separating unit 301, because the pixel value of the corresponding position of the corresponding provisional high-resolution image is not corrected, the corresponding-point searching unit 302 does not perform the search for a corresponding point.

As explained above, according to this embodiment, the area separation is performed before the corresponding point search. Consequently, because the corresponding point search is not applied to the flat area, compared with the first embodiment, it is possible to further reduce a processing load necessary for increasing resolution of an image.

In a third embodiment of the present invention, the determining unit is not provided. Differences from the first or second embodiment are explained below.

Figure 6:
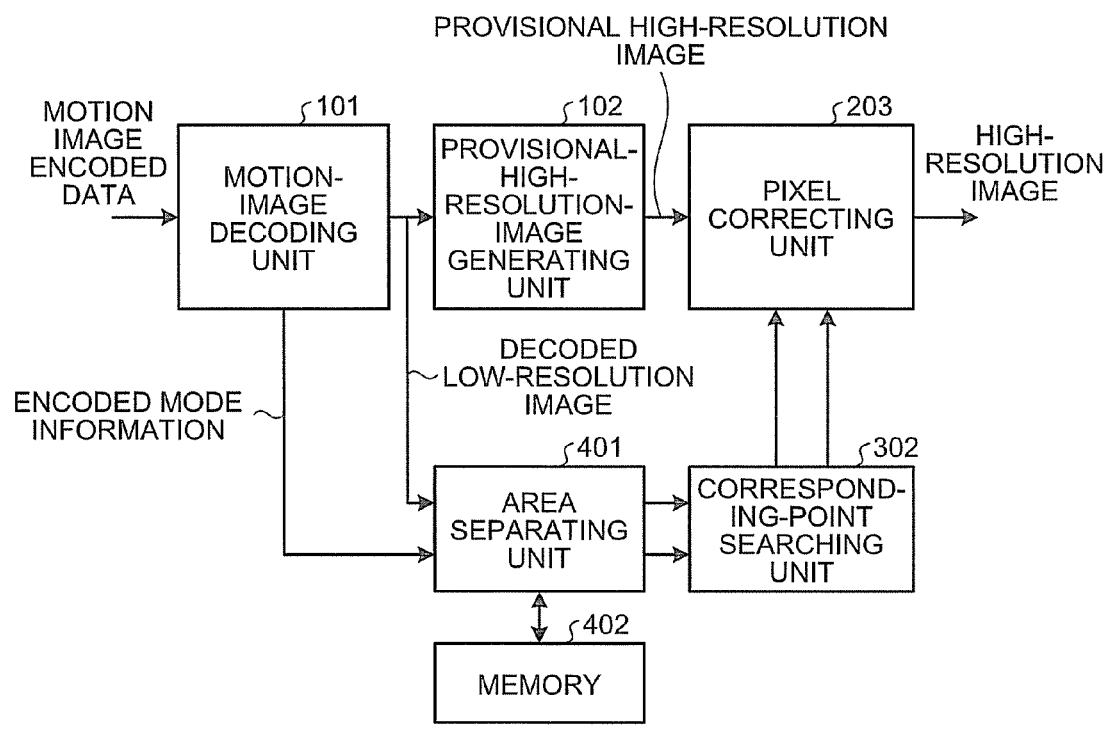
FIG. 6 is a block diagram of a configuration example of a resolution increasing apparatus according to a third embodiment of the present invention.

FIG. 6 is a block diagram of a configuration example of a resolution increasing apparatus according to the third embodiment. In the resolution increasing apparatus, the determining unit 103 and the switch 201, the memory 204, and the area separating unit 301 of the high-resolution-image correcting unit 104 are deleted from the configurations shown in FIGS. 1 and 5 in the second embodiment. The resolution increasing apparatus includes an area separating unit 401 and a memory 402.

The area separating unit 401 receives the input of encoded mode information and a decoded low-resolution image and applies separation of an area to each of macro blocks including a pixel of attention. As an example, the area is separated into two areas: an edge area and a flat area. A method of separating the area is the same as the processing by the area separating unit 301. The method can be applied when the area is separated into three or more areas. The area separating unit 401 outputs area separation information as a result of the separation and the decoded low-resolution image to the corresponding-point searching unit 302. The memory 402 stores area separation information for each of pixels obtained when an area is separated in a process for generating a high-resolution image in the past.

The resolution increasing apparatus according to this embodiment performs conversion processing for an image in two units: the provisional-high-resolution-image generating unit 102 and the pixel correcting unit 203. In other words, the resolution increasing apparatus performs image conversion processing in two stages.

Figure 7A:
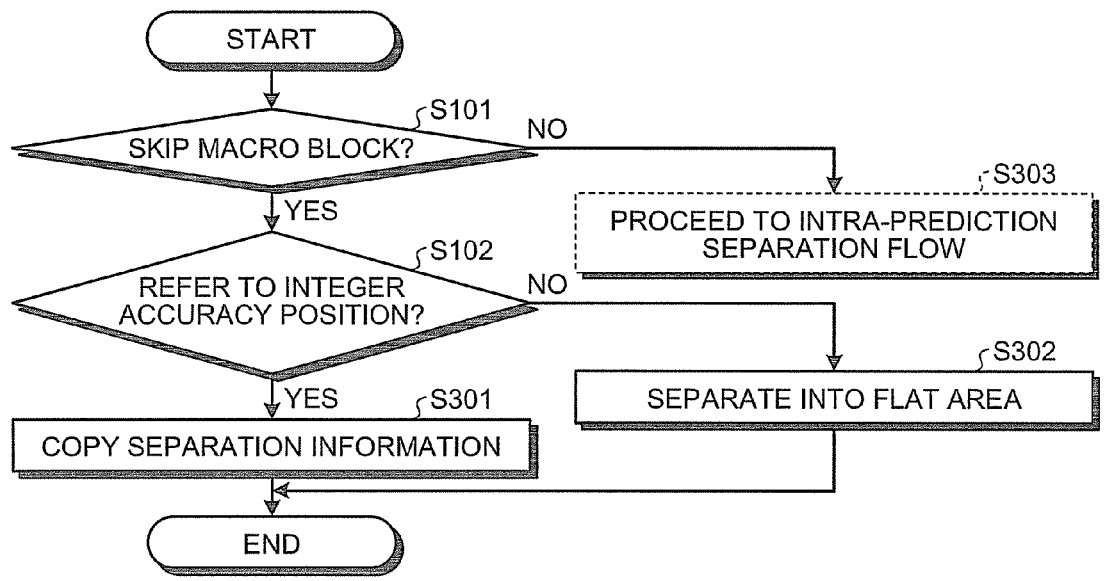
FIG. 7A is a flowchart of processing by an area separating unit.

FIG. 7A is a flowchart of processing by the area separating unit 401. A macro block including a pixel of attention is a skip macro block.

When a motion vector of the macro block including the pixel of attention refers to an integer accuracy position ("Yes" at step S102), the area separating unit 401 sets an area of pixels included in the macro block the same as an area of pixels in a position equivalent to the macro block in an image subjected to area separation in a process for generating a high-resolution image in the past (hereinafter, "second reference position") (step S301). The area separating unit 401 extracts information concerning the area of the second reference position from area separation information in the area separation in the past stored in the memory 402 and sets the area of the pixels included in the macro block the same as the area of the pixels in the second reference position. On the other hand, when the motion vector does not refer to the integer accuracy position ("No" at step S102), the area separating unit 401 separates all the pixels included in the macro block into the flat area (step S302).

When the macro block including the pixel of attention is not the skip macro block ("No" at step S101), the area separating unit 401 proceeds to an intra-prediction separation flow (step S303). FIG. 7B is a flowchart of the intra-prediction separation flow.

The intra-prediction separation flow by the area separating unit 401, i.e., separation processing performed when a prediction mode of the macro block including the pixel of attention is an intra-prediction mode is explained with reference to FIG. 7B. Separation processing performed when a prediction mode of a sub-macro block is the intra-prediction mode is the same.

When the prediction mode of the macro block including the pixel of attention is the intra-prediction mode ("Yes" at step S106) and the intra-prediction mode is a direction prediction mode at an angle within ±45° from the horizontal (left or right) direction ("Yes" at step S304), in area separation processing performed for each of pixels included in the macro block, the area separating unit 401 omits processing for searching for a vertical edge and performs separation processing for searching for only a horizontal edge (step S305). On the other hand, when the intra-prediction mode is not the direction prediction mode at an angle within ±45° from the horizontal (left or right) direction ("No" at step S304) and is a direction prediction mode at an angle smaller than ±45° from the vertical (up or down) direction ("Yes" at step S306), in the area separation processing performed for each of the pixels included in the macro block, the area separating unit 401 omits processing for searching for a horizontal edge and performs separation processing for searching of only a vertical edge (step S307).

When the intra-prediction mode is not the direction prediction mode at an angle smaller than ±45° from the vertical (up or down) direction ("No" at step S306) and satisfies conditions "the intra-prediction mode is not a direction prediction mode" and "DCT coefficients are only DC components or all the DCT coefficients are 0" ("Yes" at step S308), the area separating unit 401 separates all the pixels included in the macro block into the flat area (step S309). On the other hand, when the intra-prediction mode is the direction prediction mode or does not satisfy the condition that "DCT coefficients are only DC components or all the DCT coefficients are 0" ("No" at step S308), the area separating unit 401 performs processing for area separation (step S310).

The direction prediction mode at an angle within ±45° from the horizontal (left or right) direction is, for example, a prediction mode that is set when Intra4×4PreMode indicating a prediction direction mode of intra-prediction for 4×4 blocks described in H.264 specified by ITU-T is any one of 1, 3, 4, 6, and 8. On the other hand, the direction prediction mode at an angle smaller than ±45° from the vertical (up or down) direction is a prediction mode that is set when Intra4×4PreMode is any one of 0, 5, and 7. A prediction direction mode of intra-prediction for 8×8 blocks is the same except that a syntax indicating the prediction direction mode is replaced with Intra8×8PredMode. Concerning intra-prediction for 16×16 blocks, the direction prediction mode at an angle within ±45° from the horizontal (left or right) direction is a prediction mode that is set when Intra16×16PredMode described in H.264 specified by ITU-T is 1. On the other hand, the direction prediction mode at an angle smaller than ±45° from the vertical (up or down) direction is a prediction mode that is set when Intra16×16PredMode is 0.

Figure 7C:
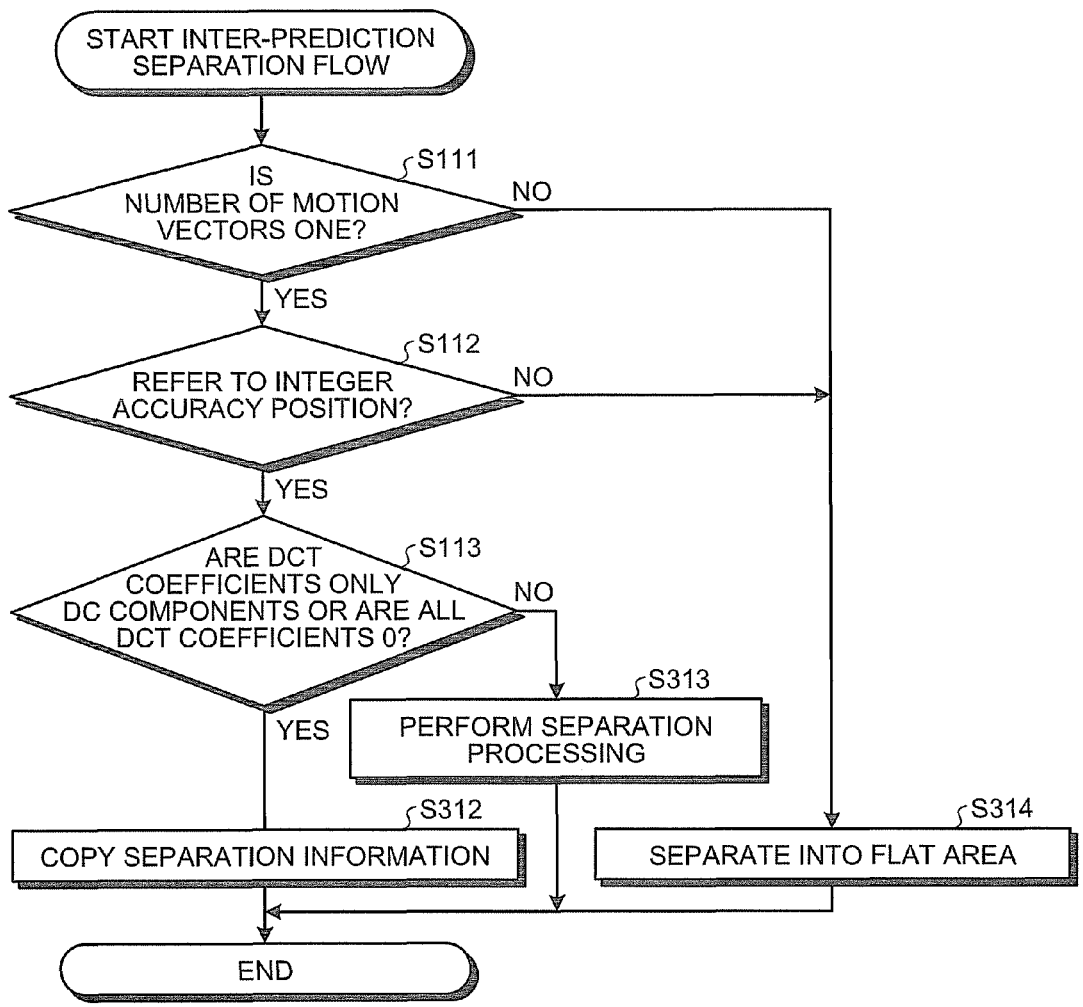
FIG. 7C is a flowchart of processing by the area separating unit.

When the prediction mode of the macro block including the pixel of attention is not the intra-prediction mode ("No" at step S106), the area separating unit 401 proceeds to an inter-prediction separation flow (step S311). FIG. 7C is a flowchart of the inter-prediction separation flow.

The inter-prediction separation flow by the area separating unit 401, i.e., separation processing performed when the prediction mode of the macro block including the pixel of attention is an inter-prediction mode is explained with reference to FIG. 7C. Separation processing performed when a prediction mode of a sub-macro block is the inter-prediction mode is the same.

When DCT coefficients of the macro block are only DC components or all the DCT components are 0 ("Yes" at step S113), the area separating unit 401 sets an area of pixels included in the macro block the same as an area of pixels in the second reference position in an image subjected to area separation in a process for generating a high-resolution image in the past (step S312). When the condition that the DCT coefficients of the macro block are only DC components or all the DCT coefficients are 0 is not satisfied ("No" at step S113), the area separating unit 401 performs the processing for area separation (step S313).

When the number of motion vectors of the macro block including the pixel of attention is equal to or larger than two ("No" at step S111), the area separating unit 401 separates all the pixels included in the macro block into the flat area (step S314). When the motion vector does not refer to the integer accuracy position ("No" at step S112), the area separating unit 401 also separates all the pixels included in the macro block into the flat area (step S314).

Even when the area separating unit 401 separates the pixels into the flat area in the processing (steps S302 and S314), the area separating unit 401 can perform the processing for area separation if there is a margin in a calculation amount of the apparatus.

When the area separating unit 401 performs the processing for area separation (steps S310 and S313) or when the area separating unit 401 performs the processing for area separation because there is the margin in the calculation amount (steps S302 and S314), the area separating unit 401 can further perform the processing for area separation according to comparison with a threshold explained below.

Figure 8:
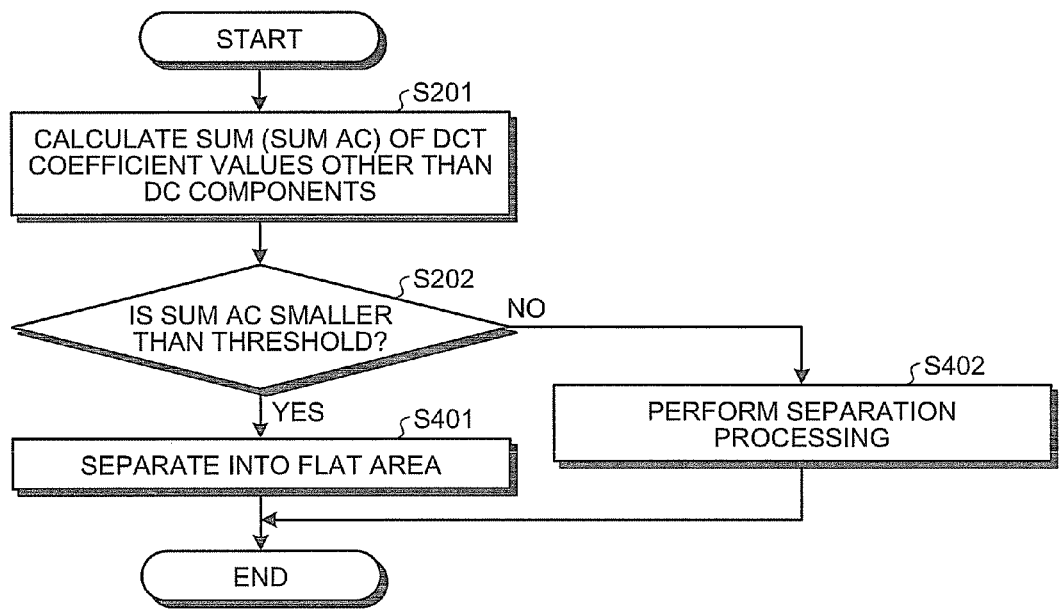
FIG. 8 is a flowchart of processing by the area separating unit.

FIG. 8 is a flowchart of comparison processing with the threshold. For example, when the sum SumAC is smaller than the threshold TH ("Yes" at step S202), the area separating unit 401 separates all the pixels included in the macro block into the flat area (step S401). On the other hand, when the sum SumAC is equal to or larger than the threshold TH ("No" at step S202), the area separating unit 401 performs the processing for area separation (step S402).

The processing by the area separating unit 401 is summarized as explained below.

When all the pixels included in the macro block are separated into the flat area, the area separating unit 401 outputs an indication to that effect as area separation information.

When the processing for area separation is performed, the area separating unit 401 separates the pixels included in the macro block into the edge area or the flat area and outputs a result of the separation as area separation information.

When the area separation information in the past is used, the area separating unit 401 extracts the information concerning the area in the second reference position from the area separation information in the past stored in the memory 402, sets the area of the pixels included in the macro block the same as the area of the pixels in the second reference position, and outputs an indication to that effect as area separation information.

The corresponding-point searching unit 302 searches for a corresponding point based on the area separation information and the decoded low-resolution image from the area separating unit 401. The corresponding-point searching unit 302 applies corresponding point search to the pixels separated into the edge area by the area separating unit 401 and outputs corresponding point search information. The corresponding-point searching unit 302 does not apply corresponding point search to the pixels separated into the flat area by the area separating unit 401 and outputs an indication that the pixels are the flat area (in which correction of a pixel value of a corresponding position is unnecessary) as corresponding position search information.

As explained above, according to this embodiment, the area separating unit 401 applies, based on the encoded mode information, the area separation to each of the macro blocks including the pixel of attention. This makes it possible to limit pixels subjected to the separation processing and reduce a processing load necessary for increasing resolution of an image.

In a fourth embodiment of the present invention, the determining unit and the area separating unit are not provided. Differences from the first to third embodiments are explained below.

Figure 9:
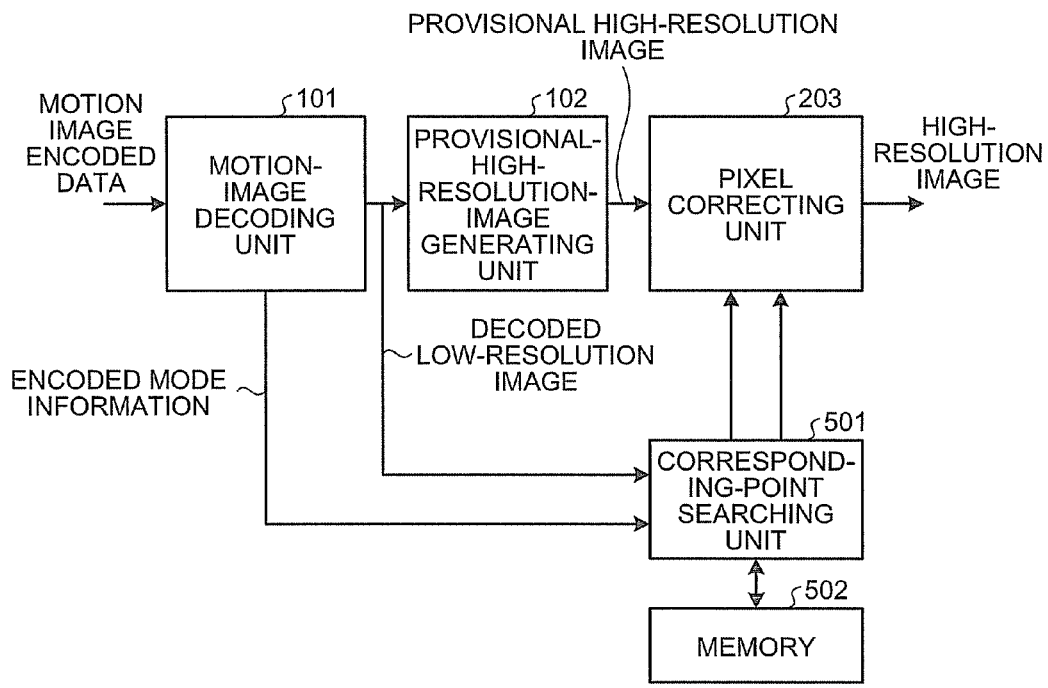
FIG. 9 is a block diagram of a configuration example of a resolution increasing apparatus according to a fourth embodiment of the present invention.

FIG. 9 is a block diagram of a configuration example of a resolution increasing apparatus according to the fourth embodiment. In the resolution increasing apparatus, the area separating unit 401, the memory 402, and the corresponding-point searching unit 302 are deleted from the configuration shown in FIG. 6 in the third embodiment. The resolution increasing apparatus includes a corresponding-point searching unit 501 and a memory 502.

The corresponding-point searching unit 501 receives the input of encoded mode information and a decoded low-resolution image and searches for a corresponding point for each of macro blocks including a pixel of attention. A method for searching for a corresponding point is the same as the existing method. The corresponding-point searching unit 501 outputs corresponding point search information as a result of the search and the decoded low-resolution image to the pixel correcting unit 203. The memory 502 stores corresponding point search information for each of pixels obtained when a corresponding point is searched in a process for generating a high-resolution image in the past.

As in the third embodiment, the resolution increasing apparatus according to this embodiment performs conversion processing for an image in the two units: the provisional-high-resolution-image generating unit 102 and the pixel correcting unit 203. In other words, the resolution increasing apparatus performs image conversion processing in two stages.

Figure 10A:
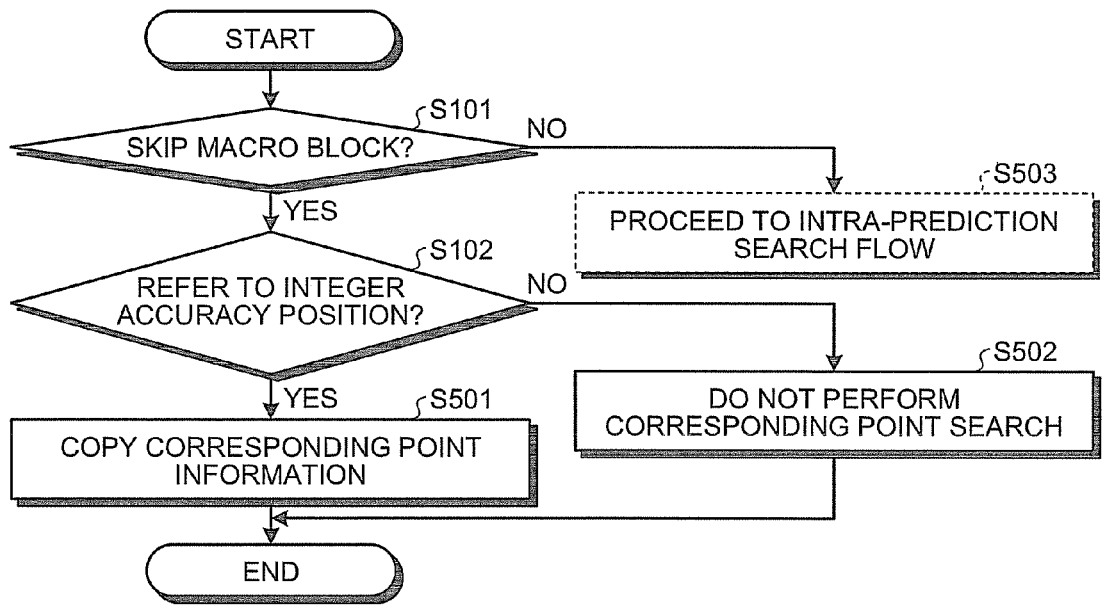
FIG. 10A is a flowchart of processing by a corresponding-point searching unit.

FIG. 10A is a flowchart of processing by the corresponding-point searching unit 501. A macro block including a pixel of attention is a skip macro block.

When a motion vector of the macro block including the pixel of attention refers to an integer accuracy position ("Yes" at step S102), the corresponding-point searching unit 501 sets a corresponding point of pixels included in the macro block the same as a corresponding point of pixels in a position equivalent to the macro block in an image subjected to corresponding point search in a process for generating a high-resolution image in the past (hereinafter, "third reference position) (step S501). The corresponding-point searching unit 501 extracts information concerning the corresponding point of the third reference position from corresponding point search information in the corresponding point search in the past stored in the memory 502 and sets the corresponding point of the pixels included in the macro block the same as the corresponding point of the pixels in the third reference position. On the other hand, when the motion vector does not refer to the integer accuracy position ("No" at step S102), the corresponding-point searching unit 501 regards the pixels included in the macro block as the flat area and does not perform the corresponding point search (step S502).

Figure 10B:
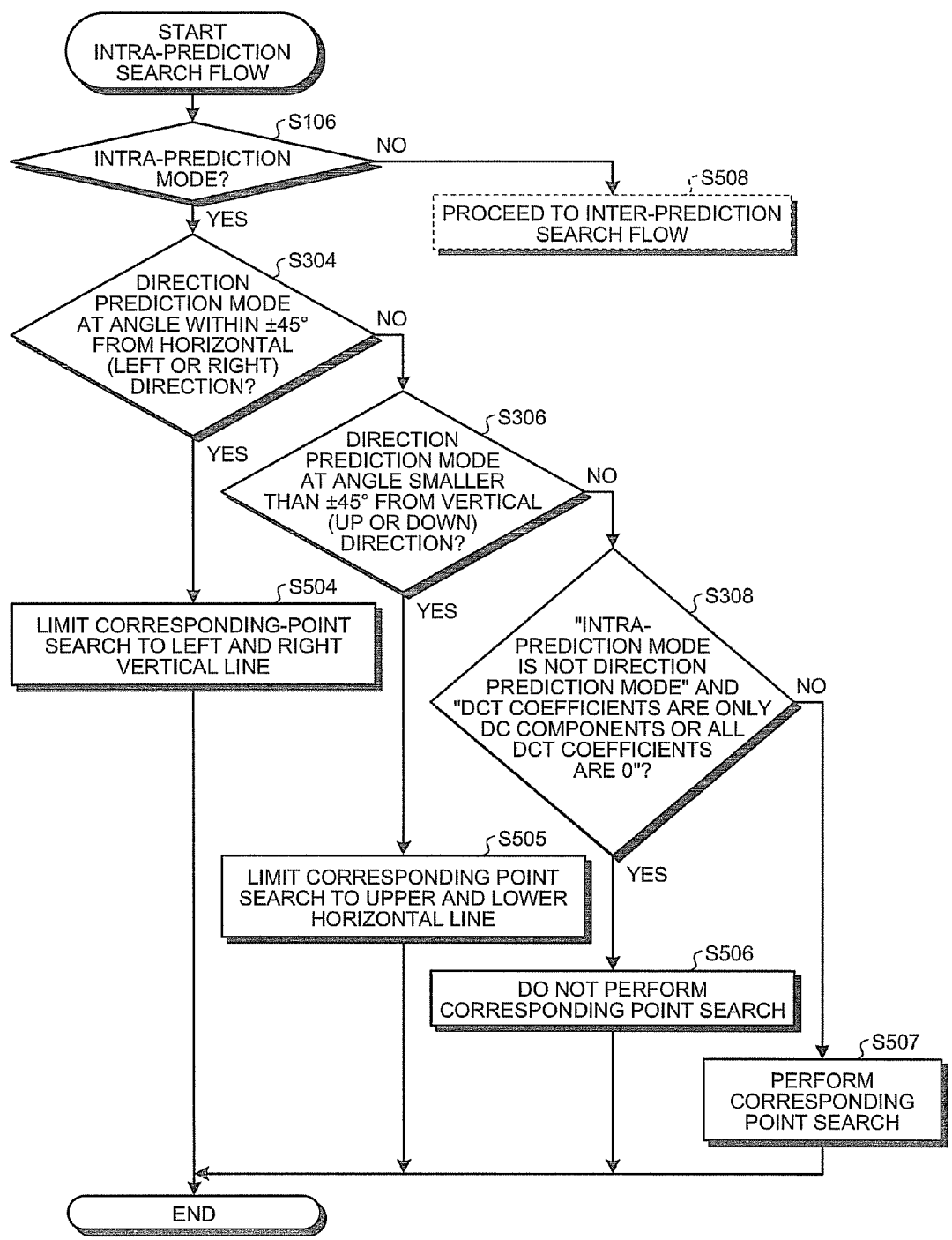
FIG. 10B is a flowchart of processing by the corresponding-point searching unit.

When the macro block including the pixel of attention is not the skip macro block ("No" at step S101), the corresponding-point searching unit 501 proceeds to an intra-prediction search flow (step S503). FIG. 10B is a flowchart of the intra-prediction search flow.

The intra-prediction search flow by the corresponding-point searching unit 501, i.e., search processing performed when a prediction mode of the macro block including the pixel of attention is an intra-prediction mode is explained with reference to FIG. 10B. Search processing performed when a prediction mode of a sub-macro block is the intra-prediction mode is the same.

When the intra-prediction mode is a direction prediction mode at an angle within ±45° from the horizontal (left or right) direction ("Yes" at step S304), in corresponding point search performed for each of pixels included in the macro block, the corresponding-point searching unit 501 limits a range of the corresponding point search to left and right vertical lines (step S504). On the other hand, when the intra-prediction mode is not the direction prediction mode at an angle within ±45° from the horizontal (left or right) direction ("No" at step S304) and is a direction prediction mode at an angle smaller than ±45° from the vertical (up or down) direction ("Yes" at step S306), in the corresponding point search performed for each of the pixels included in the macro block, the corresponding-point searching unit 501 limits a range of the corresponding point search to upper and lower horizontal lines (step S505).

When the intra-prediction mode is not the direction prediction mode at an angle smaller than ±45° from the vertical (up or down) direction ("No" at step S306) and satisfies conditions "the intra-prediction mode is not a direction prediction mode" and "DCT coefficients are only DC components or all the DCT coefficients are 0" ("Yes" at step S308), the corresponding-point searching unit 501 regards the pixels included in the macro block as the flat area and does not perform the corresponding point search (step S506). On the other hand, when the intra-prediction mode is the direction prediction mode or does not satisfy the condition that "DCT coefficients are only DC components or all the DCT coefficients are 0" ("No" at step S308), the corresponding-point searching unit 501 performs the corresponding point search (step S507).

When the prediction mode of the macro block including the pixel of attention is not the intra-prediction mode ("No" at step S106), the corresponding-point searching unit 501 proceeds to an inter-prediction search flow (step S508). FIG. 10C is a flowchart of the inter-prediction search flow.

The inter-prediction search flow by the corresponding-point searching unit 501, i.e., search processing performed when the prediction mode of the macro block including the pixel of attention is an inter-prediction mode is explained with reference to FIG. 10C. Search processing performed when a prediction mode of a sub-macro block is the inter-prediction mode is the same.

When DCT coefficients of the macro block are only DC components or all the DCT components are 0 ("Yes" at step S113), the corresponding-point searching unit 501 sets a corresponding point of pixels included in the macro block the same as corresponding point of pixels in the third reference position in an image subjected to corresponding point search in a process for generating a high-resolution image in the past (step S509). When the condition that the DCT coefficients of the macro block are only DC components or all the DCT coefficients are 0 is not satisfied ("No" at step S113), the corresponding-point searching unit 501 performs the corresponding point search (step S510).

When the number of motion vectors of the macro block including the pixel of attention is equal to or larger than two ("No" at step S111), the corresponding-point searching unit 501 regards the pixels included in the macro block as the flat area does not perform the corresponding point search (step S511). When the motion vector does not refer to the integer accuracy position ("No" at step S112), the corresponding-point searching unit 501 also regards the pixels included in the macro block as the flat area and does not perform the corresponding point search (step S511).

Even when the corresponding-point searching unit 501 does not perform the corresponding point search in the processing (steps S502 and S511), the corresponding-point searching unit 501 can perform the corresponding point search if there is a margin in a calculation amount of the apparatus.

When the corresponding-point searching unit 501 performs the corresponding point search (steps S507 and S510) or when the corresponding-point searching unit 501 performs the corresponding point search because there is the margin in the calculation amount (steps S502 and S511), the corresponding-point searching unit 501 can further perform the corresponding point search according to comparison with a threshold explained below.

Figure 11:
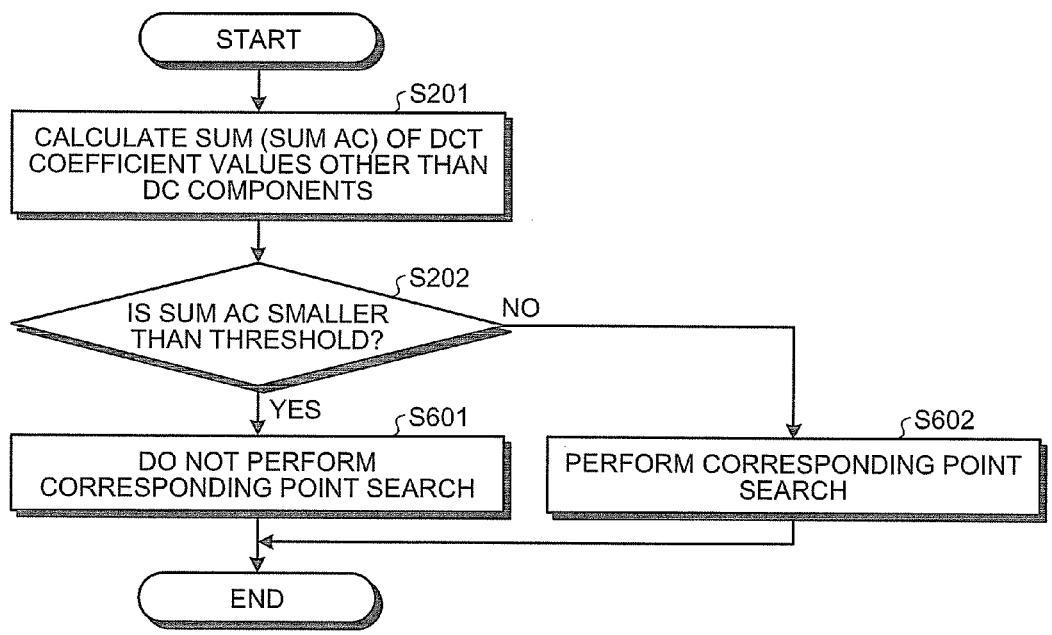
FIG. 11 is a flowchart of processing by the corresponding-point searching unit.

FIG. 11 is a flowchart of comparison processing with the threshold. For example, when the sum SumAC is smaller than the threshold TH ("Yes" at step S202), the corresponding-point searching unit 501 regards the pixels included in the macro block as the flat area and does not perform the corresponding point search (step S601). On the other hand, when the sum SumAC is equal to or larger than the threshold TH ("No" at step S202), the corresponding-point searching unit 501 performs the corresponding point search (step S602).

The processing by the corresponding-point searching unit 501 is summarized as explained below.

When the corresponding point search is not performed, the corresponding-point searching unit 501 outputs an indication to that effect as corresponding point search information.

When the corresponding point search is performed, the corresponding-point searching unit 501 applies the corresponding point search to the pixels included in the macro block and outputs a result of the corresponding point search as corresponding point search information.

When the corresponding point search information in the past is used, the corresponding-point searching unit 501 extracts the information concerning the corresponding point of the pixels in the third reference position from the corresponding point search information in the past stored in the memory 502, sets the corresponding points of the pixels included in the macro block the same as the corresponding points of the pixels in the third reference position, and outputs an indication to that effect as corresponding point search information.

As explained above, according to this embodiment, the corresponding-point searching unit 501 performs, based on the encoded mode information, the corresponding point search for each of the macro blocks including the pixel of attention. This makes it possible to limit pixels subjected to the corresponding point search and reduce a processing load necessary for increasing resolution of an image.

In a fifth embodiment of the present invention, encoded mode information and area separation information are input to the corresponding-point searching unit.

FIG. 12 is a block diagram of a configuration example of a resolution increasing apparatus according to the fifth embodiment. In the resolution increasing apparatus, the corresponding-point searching unit 501 is deleted from the configuration shown in FIG. 9 in the fourth embodiment. The resolution increasing apparatus includes the area separating unit 301 and a corresponding-point searching unit 601.

The corresponding-point searching unit 601 receives the input of the encoded mode information and the area separation information from the area separating unit 301, performs corresponding point search, and outputs corresponding point search information and a decoded low-resolution image to the pixel correcting unit 203. In this embodiment, as in the fourth embodiment, the corresponding-point searching unit 601 performs the corresponding point search based on the encoded mode information. However, the corresponding-point searching unit 601 does not apply the corresponding point search to the pixels separated into the flat area by the area separating unit 301. Processing by the corresponding-point searching unit 601 is the same as the processing explained with reference to the flowcharts (FIGS. 10A to 11) in the fourth embodiment except that the corresponding point search is not applied to the pixels separated into the flat area.

The area separating unit 301 can be replaced with the area separating unit 401 that receives the input of the encoded mode information and the decoded low-resolution signal. FIG. 13 is a block diagram of a configuration example of a resolution increasing apparatus in which the area separating unit 301 is replaced with the area separating unit 401. Processing by the area separating unit 401 is the same as the processing explained with reference to the flowcharts (FIGS. 7a to 8) in the third embodiment. Processing by the corresponding-point searching unit 601 is the same as that explained above.

As in the third and fourth embodiments, both the resolution increasing apparatuses according to this embodiment perform conversion processing for an image in the two units: the provisional-high-resolution-image generating unit 102 and the pixel correcting unit 203. In other words, the resolution increasing apparatuses perform image conversion processing in two stages.

However, concerning a threshold used when the processing for separating an area is limited (FIG. 8) and when the processing for searching for a corresponding point is limited (FIG. 11), conditions explained below are added to the condition indicated by Formula (1). A threshold in the area separating unit 401 is set as "TH'x (x∈{intra, inter}) and a threshold in the corresponding-point searching unit 601 is set as "TH'x (x∈{intra, inter}). The proportional coefficient and an offset value of Formula (1) are adjusted such that "THx>TH'x" (the latter threshold in the corresponding-point searching unit 601 is smaller) concerning all "x".

As explained above, according to this embodiment, the area separation is performed before the corresponding point search. Consequently, because the corresponding point search is not applied to the flat area, compared with the fourth embodiment, a processing load necessary for increasing resolution of an image can be further reduced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A resolution increasing apparatus that decodes encoded data of a motion image compressed by a motion image encoding system and generates a high-resolution image from an image after the decoding, the resolution increasing apparatus comprising:
   a provisional-high-resolution-image generating unit that sequentially sets images formed by the image after the decoding as a reference frame, generates, from the reference frame, a provisional high-resolution image having a number of pixels larger than that of the reference frame according to interpolation processing, sets a plurality of pixels included in the reference frame as a pixel of attention one by one, and acquires, based on the encoded data, predetermined encoded mode information for each pixel of attention or each specific range including the pixel of attention;
   a determining unit that determines, based on encoded mode information corresponding to the pixel of attention, whether correction to a pixel value of a corresponding position of the provisional high-resolution image equivalent to a position of motion 0 with respect to the pixel of attention is performed;
   a corresponding-point searching unit that acquires a corresponding point corresponding to the pixel of attention at decimal number accuracy out of the image after the decoding; and
   an image correcting unit that applies, when the determining unit determines that the correction for the pixel value of the corresponding position of the provisional high-resolution image is performed, predetermined correction processing to the pixel value of the corresponding position of the provisional high-resolution image and outputs, when the determining unit determines that the correction is not performed, the pixel value of the corresponding position of the provisional high-resolution image as a high-resolution image.

2. The resolution increasing apparatus according to claim 1, wherein the provisional-high-resolution-image generating unit sets the specific range as a macro block unit.

3. The resolution increasing apparatus according to claim 1, wherein the provisional-high-resolution-image generating unit sets the specific range as a sub-macro block unit.

4. The resolution increasing apparatus according to claim 1, wherein the corresponding-point searching unit searches for and acquires the corresponding point according to a parabola fitting method.

5. The resolution increasing apparatus according to claim 1, wherein the corresponding-point searching unit searches for and acquires the corresponding point according to an over-sampling method.

6. The resolution increasing apparatus according to claim 1, wherein the image correcting unit performs the predetermined correction processing according to a POCS method.

7. The resolution increasing apparatus according to claim 1, wherein the image correcting unit performs the predetermined correction processing according to a superimposition method.

8. The resolution increasing apparatus according to claim 1, further comprising a high-resolution-image storing unit for storing a high-resolution image generated in the past, wherein the image correcting unit performs, as the predetermined correction processing, readout of a pixel value from the high-resolution-image storing unit and sets a pixel value of a corresponding position of the provisional high-resolution image the same as a pixel value of a position equivalent to the corresponding position in the high-resolution image generated in the past.

9. The resolution increasing apparatus according to claim 1, further comprising an area separating unit that separates each of pixels included in the image formed by the image after the decoding into one area among a plurality of areas classified with reference to a difference between a pixel value of the pixel and a pixel value of a pixel adjacent to the pixel, wherein
the corresponding-point searching unit does not perform, based on a separation result of the area separating unit, search for the corresponding point concerning a pixel separated into an area indicating that a difference between a pixel value of the pixel and a pixel value of a pixel adjacent to the pixel is smaller than a predetermined threshold, and
the image correcting unit does not correct, irrespective of a result of the determining unit, correction of a pixel value of a corresponding position of the provisional high-resolution image corresponding to the pixel to which the corresponding-point searching unit does not apply the corresponding point search.

10. A resolution increasing apparatus that decodes encoded data of a motion image compressed by a motion image encoding system and generates a high-resolution image from an image after the decoding, the resolution increasing apparatus comprising:
a provisional-high-resolution-image generating unit that sequentially sets images formed by the image after the decoding as a reference frame, generates, from the reference frame, a provisional high-resolution image having a number of pixels larger than that of the reference frame according to interpolation processing, sets a plurality of pixels included in the reference frame as a pixel of attention one by one, and acquires, based on the encoded data, predetermined encoded mode information for each pixel of attention or each specific range including the pixel of attention;
an area separating unit that separates based on encoded mode information corresponding to the pixel of attention, the pixel of attention into one area among a plurality of areas classified with reference to a difference between a pixel value of the pixel of attention and a pixel value of a pixel adjacent to the pixel of attention;
a corresponding-point searching unit that does not perform search for a corresponding point concerning a pixel of attention separated into an area indicating that a difference between a pixel value of the pixel of attention and a pixel value of a pixel adjacent to the pixel of attention is smaller than a predetermined threshold and acquires a corresponding point corresponding to a pixel of attention separated into another area at decimal number accuracy out of the pixel signal after the decoding; and
an image correcting unit that performs predetermined correction processing concerning a pixel value of a corresponding position of the provisional high-resolution image corresponding to a pixel of attention to which the corresponding-point searching unit applies the corresponding point search and, concerning a pixel value of a corresponding position of the provisional high-resolution image corresponding to a pixel of attention to which the corresponding-point searching unit does not apply the corresponding point search, does not perform the correction processing and outputs the pixel value of the corresponding position of the provisional high-resolution image as a high-resolution image.

11. The resolution increasing apparatus according to claim 10, wherein the provisional-high-resolution-image generating unit sets the specific range as a macro block unit.

12. The resolution increasing apparatus according to claim 10, wherein the provisional-high-resolution-image generating unit sets the specific range as a sub-macro block unit.

13. The resolution increasing apparatus according to claim 10, further comprising an area-separation-information storing unit for storing area separation information for each of pixels obtained when an area is separated in a process for generating a high-resolution image in the past, wherein
the area separating unit reads out the area separation information from the area-separation-information storing unit in a predetermined case and sets an area of the pixel of attention the same as an area of pixels in a position equivalent to the pixel of attention in an image subjected to area separation in the process for generating a high-resolution image in the past.

14. The resolution increasing apparatus according to claim 10, wherein the area separating unit performs, in an intra-prediction mode, separation processing for searching for only a horizontal edge when the intra-prediction mode is a direction prediction mode at an angle within ±45° from a horizontal direction and performs separation processing for searching for only a vertical edge when the intra-prediction mode is a direction prediction mode at an angle smaller than ±45° from a vertical direction.

15. A resolution increasing apparatus that decodes encoded data of a motion image compressed by a motion image encoding system and generates a high-resolution image from an image after the decoding, the resolution increasing apparatus comprising:
a provisional-high-resolution-image generating unit that sequentially sets images formed by the image after the decoding as a reference frame, generates, from the reference frame, a provisional high-resolution image having a number of pixels larger than that of the reference frame according to interpolation processing, sets a plurality of pixels included in the reference frame as a pixel of attention one by one, and acquires, based on the encoded data, predetermined encoded mode information for each pixel of attention or each specific range including the pixel of attention;
a corresponding-point searching unit that does not perform search for a corresponding point when a difference between a pixel value of the pixel of attention and a pixel value of a pixel adjacent to the pixel of attention is smaller than a predetermined corresponding point search threshold and acquires, based on encoded mode information corresponding to the pixel of attention, a corresponding point of the pixel of attention out of the image after the decoding at decimal number accuracy when the difference is larger than the predetermined corresponding point search threshold; and
an image correcting unit that performs predetermined correction processing concerning a pixel value of a corresponding position of the provisional high-resolution image corresponding to a pixel of attention to which the corresponding-point searching unit applies the corresponding point search and, concerning a pixel value of a corresponding position of the provisional high-resolution image corresponding to a pixel of attention to which the corresponding-point searching unit does not apply the corresponding point search, does not perform the correction processing and outputs the pixel value of the corresponding position of the provisional high-resolution image as a high-resolution image.

16. The resolution increasing apparatus according to claim 15, wherein the provisional-high-resolution-image generating unit sets the specific range as a macro block unit.

17. The resolution increasing apparatus according to claim 15, wherein the provisional-high-resolution-image generating unit sets the specific range as a sub-macro block unit.

18. The resolution increasing apparatus according to claim 15, further comprising a corresponding-point-search-information storing unit for storing corresponding point search information for each of pixels obtained when a corresponding point is searched in a process for generating a high-resolution image in the past, wherein the corresponding-point searching unit reads out the corresponding point search information from the corresponding-point-search-information storing unit in a predetermined case and sets a corresponding point of the pixel of attention the same as a corresponding point of pixels in a position equivalent to the pixel of attention in an image subjected to corresponding point search in the process for generating a high-resolution image in the past.

19. The resolution increasing apparatus according to claim 15, wherein the corresponding-point searching unit limits, in an intra-prediction mode, the corresponding point search to left and right vertical lines when the intra-prediction mode is a direction prediction mode at an angle within ±45° from a horizontal direction and limits the corresponding point search to upper and lower horizontal lines when the intra-prediction mode is a direction prediction mode at an angle smaller than ±45° from a vertical direction.

20. The resolution increasing apparatus according to claim 15, further comprising an area separating unit that separates each of pixels included in the image formed by the image after the decoding into one area among a plurality of areas classified with reference to a difference between a pixel value of the pixel and a pixel value of a pixel adjacent to the pixel, wherein the corresponding-point searching unit does not perform, based on a separation result of the area separating unit, the corresponding point search concerning a pixel separated into an area indicating that that a difference between a pixel value of the pixel and a pixel value of a pixel adjacent to the pixel is smaller than a predetermined separation threshold value (a area separation threshold>a corresponding point search threshold).

* * * * *